(12) United States Patent
Koga et al.

(10) Patent No.: US 6,989,266 B2
(45) Date of Patent: Jan. 24, 2006

(54) **CONCRETE PRODUCT CONTAINING A MIXTURE OF *BACILLUS* MICROBIAL CELLS**

(75) Inventors: Masayuki Koga, Fukuoka (JP); Yoko Koga, Fukuoka (JP)

(73) Assignee: Koyoh Corporation, Ltd., Fukuoka (JP)

( * ) Notice: Subject to any disclaimer, the term of this patent is extended or adjusted under 35 U.S.C. 154(b) by 213 days.

(21) Appl. No.: 10/432,257

(22) PCT Filed: Dec. 10, 2001

(86) PCT No.: PCT/JP01/10807

§ 371 (c)(1),
(2), (4) Date: Jul. 3, 2003

(87) PCT Pub. No.: WO02/48069

PCT Pub. Date: Jun. 20, 2002

(65) Prior Publication Data

US 2005/0029187 A1    Feb. 10, 2005

(30) Foreign Application Priority Data

Dec. 12, 2000    (JP)    ............................. 2000-377885

(51) Int. Cl.
     *A01N 63/00*      (2006.01)
     *B09B 3/00*      (2006.01)
     *C12N 1/00*      (2006.01)
     *C12N 1/20*      (2006.01)

(52) U.S. Cl. .............................. 435/262.5; 435/252.4; 435/252.5; 435/822; 435/839; 210/348; 210/510.1; 424/93.46; 424/93.461; 424/93.462

(58) Field of Classification Search ............... 424/93.1; 435/252.1

See application file for complete search history.

(56) References Cited

FOREIGN PATENT DOCUMENTS

| | | |
|---|---|---|
| JP | 02-169093 | 6/1990 |
| JP | 04-354533 | 12/1992 |
| JP | 07-330529 | 12/1995 |
| JP | 08-169745 | 7/1996 |
| JP | 10-113688 | 5/1998 |

OTHER PUBLICATIONS

Imahori et al, "Seikagaku Jiten" 3$^{rd}$ edition, Tokyo Kagaku Doujin Oct. 8, 1997.*

* cited by examiner

*Primary Examiner*—David M. Naff
*Assistant Examiner*—Deborah K. Ware
(74) *Attorney, Agent, or Firm*—Jordan and Hamburg LLP

(57) ABSTRACT

A cement paste containing microbial cells which has a sustained effect and an excellent function of purifying water. This cement paste contains a mixture of *Bacillus subtilis*, *Bacillus thuringiensis* and *Bacillus sphaericus* cells at a mixing ratio by mass of 0.1 to 50:0.1 to 50:0.1 to 50.

3 Claims, No Drawings

CONCRETE PRODUCT CONTAINING A MIXTURE OF *BACILLUS* MICROBIAL CELLS

TECHNICAL FIELD

The present invention relates to a cement paste containing microbial cells. The cement paste of the present invention is usable, for example, in producing concrete effective for water purification.

BACKGROUND ART

There has been known a technique of using a useful microorganism or microbial cell, such as yeasts, as one of additives for concrete to produce a microbe-contained concrete usable as water-purifier-tank walls or floor linings of a water-purifying facility in homes, industrial plants or livestock farms (e.g. Japanese Patent Laid-Open Publication Nos. H08-169745 and H10-113688).

While the above publications disclose the above technical concept, any dominant microbial cell is not clearly disclosed therein. In fact, no concrete product containing microbial cells has been placed on the market. It can be assumed that even if microbial cells are mixed in cement generally having strong alkalinity, most of the microbial cell will die without bringing out a desired effect persistently.

DISCLOSURE OF INVENTION

It is an object of the present invention to provide a microbe-contained cement paste capable of providing an excellent water-purification effect with long-term persistence.

According to the present invention, there is provided a cement paste containing a mixture of microbial cells comprising *Bacillus subtilis*, *Bacillus thuringiensis* and *Bacillus sphaericus*.

In a specific embodiment, the mixing ratio by mass of *Bacillus subtilis*:*Bacillus thuringiensis*:*Bacillus sphaericus* may be 0.1 to 50:0.1 to 50:0.1 to 50.

The cement paste of the present invention may comprise, but not limited to, a conventional cement material such as normal portland cement, or blast furnace or slag cement.

The cement paste of the present invention contains the mixture of microbial cells comprising *Bacillus subtilis*, *Bacillus thuringiensis* and *Bacillus sphaericus*. These known microbial cells can be readily extracted from soil and cultured. Preferably, the mixing ratio by mass of the three kinds of microbial cells is 0.1 to 50:0.1 to 50:0.1 to 50. Preferably, the mixture is mixed in the cement at about 30 mass % with respect to the mass of the cement. The three kinds of microbial cells have sufficient resistances against strong alkalinity even after they are mixed in the cement paste, and against high-temperature during production processes. The cement containing the microbial cells can be used for purifying water such as river water or lake water, and in particular, can be effectively used at a location where water flows at a low rate with stagnation.

For example, a concrete product using the concrete paste of the present invention may be a concrete plate prepared by mixing the cement paste containing the three kinds of microbial cells with crushed natural stones and water, and then shaping/curing/hardening the mixture. The concrete product may be formed as any suitable configuration, such as block or plate, according to intended purposes. Preferably, a concrete product has a configuration including thereinside a void space for facilitating proliferate of the microbial cells, as much as possible. For producing a concrete having a water-purification effect, crushed natural stones having a diameter of 2.5 to 10 mm may be used as aggregate, and the crushed natural stones may be mixed at 1500 to 1950 kg with 250 to 300 kg of cement, a certain amount of water suitable for zero-slump concrete, and about 350 cc of diluent as an additive. While a concrete product is preferable formed with a high porosity by using a relatively large aggregate of crushed natural stones having a diameter of about 10 mm, so as to allow water to flow therethrough, the present invention may also be applied to a porous concrete using a relatively small aggregate.

DESCRIPTION OF THE PREFERRED EMBODIMENT

A cement paste of the present invention will now be described in connection with a water-purifying concrete plate using the cement paste, as an example. In this example, the following materials were prepared for producing the cement plate.

(1) normal portland cement: 250 Kg
(2) 10 mm crashed natural stones: 1600 Kg
(3) diluent: 350 cc
(4) microbial cells: *Bacillus subtilis*, *Bacillus thuringiensis* and *Bacillus sphaericus* (available from BIG BIO Inc.)
The mixing ratio of the three kinds of microbial cells: 1:1:1, and the mass % of the microbial cell mixture to the mass of the cement: about 30 mass %

The above materials were mixed together, and shaped/cured/hardened to form a concrete plate.

Test Result (1) Waterway in Yanagawa City, Fukuoka, Japan

Before a test, the water had a black muddy color and bad smell, which were a subject for complaint of inhabitants. After about two weeks from the immersing of the above concrete plate of this example in the river, the smell was eliminated. Further, the water was changed in a clear color after about two months. Presently, the river water allows fishes such as carps to be populate therein. While the river had a BOD of 1400 or considerable dirtiness before the test, the BOD was reduced to 1.4, and the water was purified without bad smell after about two months.

(2) Pond in the Vicinity of Administrative Institution of Miyahara, Kumamoto, Japan While the pond was originally clean, a white suspended substance was attached to stones in the pond at the initiation of a test. After the immersing of the concrete plate of this example in the pond, the white suspended substance was gradually eliminated, and the stones were changed in a clean color. However, the change was slow because of the purpose for providing enhanced cleanness in the originally clean pond.

INDUSTRIAL APPLICABILITY

The present invention is used for producing a water-purifying concrete or the like.

The present invention can be widely used, for example, in a location, such as river, lake, waterway, pond, water tank, old-fashioned toilet or drainage canal, where putrefactive bacteria or *E. coli* bacteria are apt to procreate, an outlet of untreated wastewater from a water-purifier tank, a bank of rivers, a seawall, the bottom or vicinity of fish farms, a manure handling/disposing shed in pig houses, cow barns or chicken farms, a fountain pond in parks, or the bottom or wall of swimming pools.

What is claimed is:

1. A concrete product prepared by mixing a cement paste containing microbial cells comprising *Bacillus subtilis, Bacillus thuringiensis* and *Bacillus sphaericus*, in a ratio by mass respectively of 0.1 to 50:0.1 to 50:0.1 to 50, with crushed natural stones and water, and then shaping, curing and hardening the mixture.

2. The concrete product of claim 1 wherein said crushed natural stones have a diameter of 2.5 to 10 mm.

3. The concrete product of claim 1 wherein said crushed natural stones in the range of 1500 to 1950 kg are mixed with said cement paste in the range of 250 to 300 kg.

* * * * *